US011317998B2

(12) United States Patent
Fisker et al.

(10) Patent No.: US 11,317,998 B2
(45) Date of Patent: May 3, 2022

(54) METHOD FOR ALIGNING DIGITAL REPRESENTATIONS OF A PATIENT'S JAWS

(71) Applicant: 3SHAPE A/S, Cophenhagen K (DK)

(72) Inventors: Rune Fisker, Virum (DK); Sven Nonboe, Hillerød (DK)

(73) Assignee: 3SHAPE A/S, Copenhagen K (DK)

(*) Notice: Subject to any disclaimer, the term of this patent is extended or adjusted under 35 U.S.C. 154(b) by 211 days.

(21) Appl. No.: 16/092,620

(22) PCT Filed: Apr. 7, 2017

(86) PCT No.: PCT/EP2017/058433
§ 371 (c)(1),
(2) Date: Oct. 10, 2018

(87) PCT Pub. No.: WO2017/178380
PCT Pub. Date: Oct. 19, 2017

(65) Prior Publication Data
US 2019/0117349 A1  Apr. 25, 2019

(30) Foreign Application Priority Data

Apr. 11, 2016  (DK) .............................. PA201670214

(51) Int. Cl.
A61C 9/00 (2006.01)
A61C 11/00 (2006.01)
(Continued)

(52) U.S. Cl.
CPC .............. A61C 9/004 (2013.01); A61C 11/00 (2013.01); A61C 19/05 (2013.01); G06T 7/33 (2017.01);
(Continued)

(58) Field of Classification Search
CPC ......... A61C 9/004; A61C 11/00; A61C 19/05; A61C 13/0004; G06T 7/33; G06T 17/00;
(Continued)

(56) References Cited

U.S. PATENT DOCUMENTS 6,533,581 B1    3/2003  Moenckmeyer
9,283,061 B2    3/2016  Tank
(Continued)

FOREIGN PATENT DOCUMENTS

WO    2007130574 A1    11/2007
WO    2012125612 A2     9/2012
WO    2016046308 A1     3/2016

OTHER PUBLICATIONS

International Search Report (PCT/ISA/210) dated Jul. 18, 2017, by the European Patent Office as the International Searching Authority for International Application No. PCT/EP2017/058433.
(Continued)

Primary Examiner — Kenny A Cese
(74) Attorney, Agent, or Firm — Buchanan Ingersoll & Rooney PC

(57) ABSTRACT

A method of aligning two 3D digital representations of at least a part of each of the upper and lower jaw of a patient, the method including segmenting the 3D digital representations to determine the shape and position of each of the patient's teeth in each of the 3D digital representations; and using a set of known anatomical concepts to constrain the fit of the two 3D digital representations to get a preliminary fit.

12 Claims, 6 Drawing Sheets

(51) Int. Cl.
*A61C 19/05* (2006.01)
*G06T 7/33* (2017.01)
*G06T 19/00* (2011.01)
*G06T 17/00* (2006.01)
*G06F 30/00* (2020.01)
*G06T 19/20* (2011.01)

(52) U.S. Cl.
CPC .............. *G06F 30/00* (2020.01); *G06T 17/00* (2013.01); *G06T 19/20* (2013.01); *G06T 2207/10028* (2013.01); *G06T 2207/20101* (2013.01); *G06T 2207/30036* (2013.01)

(58) Field of Classification Search
CPC ........... G06T 19/00; G06T 2207/30036; G06T 2219/2004; G06T 19/20; G06T 2210/41; G06F 30/00
See application file for complete search history.

(56) References Cited

U.S. PATENT DOCUMENTS

| | | | | |
|---|---|---|---|---|
| 2002/0150859 | A1* | 10/2002 | Imgrund | A61C 7/00 433/24 |
| 2005/0271996 | A1* | 12/2005 | Sporbert | A61C 7/00 433/24 |
| 2006/0063135 | A1 | 3/2006 | Mehl | |
| 2011/0045428 | A1* | 2/2011 | Boltunov | G06T 19/20 433/24 |
| 2011/0268326 | A1* | 11/2011 | Kuo | G06T 7/33 382/128 |
| 2013/0317800 | A1* | 11/2013 | Wu | G06T 19/20 703/11 |
| 2015/0282904 | A1 | 10/2015 | Fisker | |
| 2015/0327961 | A1 | 11/2015 | Thompson et al. | |
| 2016/0005237 | A1* | 1/2016 | Chen | G06T 15/005 382/128 |
| 2016/0008108 | A1 | 1/2016 | Thompson et al. | |
| 2016/0008116 | A1* | 1/2016 | Glinec | G06T 19/20 433/29 |
| 2016/0120617 | A1* | 5/2016 | Jinkyun | A61B 6/4078 433/29 |
| 2017/0071706 | A1* | 3/2017 | Lee | A61C 13/0004 |

OTHER PUBLICATIONS

Kumar et al., "Automatic Feature Identification in Dental Meshes", Computer-Aided Design & Applications, 2012, pp. 747-769.
Kumar et al., "Automatic Virtual Alignment of Dental Arches in Orthodontics", Computer—Aided Design & Applications, 2013, pp. 371-398.
Zou et al., "Interactive tooth partition of dental mesh base on tooth-target harmonic field", Computers in Biology and Medicine, 2015, pp. 132-144.

* cited by examiner

METHOD FOR ALIGNING DIGITAL REPRESENTATIONS OF A PATIENT'S JAWS

FIELD OF THE INVENTION

This invention generally relates to scanning dental impressions. More particularly, the invention relates to aligning digital models of an upper and a lower jaw of a patient, where the digital models are based on scans obtained from impressions taken of the patient's oral situation.

BACKGROUND OF THE INVENTION

In the fields of restorative dentistry, orthodontistry and implant dentistry, it has for many years been common practice for dentists to take an impression of a patients jaws, including the patient's teeth. In the traditional workflow, these impressions have been sent to a dental laboratory, where a dental technician has made plaster or stone models of the patient's jaws based on the impression scans. Any restorative work such as crowns, veneers, inlays/onlays etc. have then been manually created on top of the plaster model.

Over the last 15 years, a more digital workflow has been created. It is now common practice for a dental technician to receive an impression, make a plaster model or stone model of the patient's jaw based on the impression, and scanning the stone model using a 3D scanner, to create a digital 3D model of the patient's jaw. Any design work, be it restorative, orthodontic or for implant planning, can then be accomplished digitally, using a computer software package such as the 3Shape Dental System.

It is often necessary to align the digital models of the upper and lower jaws of the patient, for example in order to take into account the antagonist of the tooth on which a crown is being designed. In order to do this, it is common practice to take the impression of the patient's jaw using a so-called triple tray, which has impression material on both sides of the tray so that both the upper and lower jaw of the patient, as well as their alignment or bite registration is taken using only this one impression tray. However, the impression taken using triple trays are not always as accurate as impressions acquired using single trays, and the alignment or bite registration is not always accurate enough.

Alternatively a bite registration can be taken using a bite plate, comprising some impression material, which the patient bites down onto. This bite plate can then be sent to the dental laboratory along with the impressions of the upper and lower jaws taken using single trays.

SUMMARY

Disclosed is a method of aligning two 3D digital representations of at least a part of each of the upper and lower jaw of a patient, the method comprising:
  Segmenting the 3D digital representations to determine the shape and position of each of the patient's teeth in each of the 3D digital representations; and
  Using a set of known anatomical concepts to constrain the fit of the two 3D digital representations to get a preliminary fit.

By segmenting the digital representations, it is possible for the computer program to determine which the position and shape of the teeth, and by using a set of known anatomical concepts or rules, it is therefore possible to automatically or semi-automatically align the two 3D digital representations of the patient's jaws.

In some embodiments, constraining the fit of the two 3D digital representations using known anatomical concepts, comprises classifying the bite of the patient, and marking characteristic matching points on both the upper and lower 3D digital representation.

The bite of the patient may also be called the occlusion. There are several ways of defining bite or occlusion. For example, as class 1, 2 and 3. In this classification, class 1 occlusion means that the teeth are aligned in cusp fossa relationship with their antagonist teeth. This is sometimes called normal or standard occlusion, and is often what is attempted to be achieved for example in orthodontic treatment.

In class 2 occlusion, the anterior maxillary teeth protrude horizontally or pushing over the mandibular teeth. The position of the buccal cusp tips are also moved anterior to the class 1 position. This type of occlusion is sometimes called over jet.

In class 3 occlusion, the anterior axillary dentition rest posterior to the mandibular anterior teeth. Posterior teeth are in cross bite meaning that the buccal cusp tips rest inside the fossae of the lower dentition, instead of the cusp tips of the lowers resting inside the fossae of the upper.

This type of occlusion can give a complex bite relationship and restorative problem with function, since restorations that look aesthetically pleasing may in some cases interfere with the function of the bite.

Having classified the bite or occlusion of the patient into one of these categories, or any other categorization of the bite, a first estimate of the fit of the two 3D digital representations can be made.

In some embodiments, constraining the fit of the two 3D digital representations using known anatomical concepts comprises classifying the bite of the patient according to a standard set of relationships, comprising one or more of:
  the soft tissue relationship;
  the frontal facial view;
  the profile facial view;
  dental relationships;
  sagittal dental relationships;
  transverse dental relationships;
  vertical dental relationships;
  the skeletal pattern.

In this way, general rules of human anatomy can be used to get a preliminary fit of the two 3D digital representations. For example the dentist can classify the patient's bite in one or more of the above categories, and the computer program can then use these known rules to achieve a preliminary fit.

In some embodiments, the preliminary fit of the two 3D digital representations is automatically optimized using a minimum energy algorithm.

Therefore, after the preliminary fit has been determined a final fit can be determined using a minimum energy algorithm that seeks to maximize for example the contact between the two 3D digital representations in a small deviation from the preliminary fit.

In some embodiments the method further comprises:
  obtaining impression scans of at least a part of each of the upper and lower jaw of a patient; and
  converting the impression scans into the 3D digital representations of the at least a part of the patient's upper and lower jaw.

Consequently, there is no need to use a triple tray in order to align the 3D digital representations of the upper and lower jaws of the patient when the 3D digital representations are obtained using an impression tray rather than an intra-oral scan. Also, it is not necessary to make plaster models of the impressions, and putting them in an articulator in order to determine the correct bite alignment. In particular, disclosed herein is a method of aligning two 3D digital representations of at least a part of each of the upper and lower jaw of a patient, the method comprising:

Obtaining the 3D digital representations of at least a part of each of the upper and lower jaw of the patient;

Manually marking on each of the 3D digital representations corresponding sets of contact points; and Aligning the two 3D digital representations in the correct bite configuration of the patient by moving the 3D digital representations into contact at the sites of the matching sets of contact points.

In this aspect of the invention, rather than using anatomical rules to constrain the fit of the two 3D digital representations, a more manual workflow is supported. By analysing the 3D digital representations, it is possible for the dentist or technician to manually mark contact points on the digital representations, and the computer program can then use this information to align the two 3D digital representations.

In some embodiments, the alignment of the two 3D digital representations are automatically optimized using a minimum energy algorithm.

Therefore, after the preliminary fit has been determined using the manually marked contact points, a final fit can be determined using a minimum energy algorithm that seeks to maximize for example the contact between the two 3D digital representations in a small deviation from the preliminary fit.

In some embodiments, the method further comprises:
obtaining impression scans of at least a part of each of the upper and lower jaw of a patient; and
converting the impression scans into the 3D digital representations of the at least a part of the patient's upper and lower jaw.

Consequently, there is no need to use a triple tray in order to align the 3D digital representations of the upper and lower jaws of the patient when the 3D digital representations are obtained using an impression tray rather than an intra-oral scan.

In one aspect, disclosed is a method of aligning two 3D digital representations of at least a part of each of the upper and lower jaw of a patient, the method comprising:

obtaining an impression scan of at least the part of each of the upper and lower jaw of the patient;

converting the impression scans to 3D digital representations of the at least a part of the upper and lower jaw of the patient;

segmenting the 3D digital representations to determine the shape and position of each of the teeth in the 3D digital representations; and aligning the 3D digital representations based on the relationship between complementary points of the teeth in each of the 3D digital representations. In this way, it is possible to align the two 3D digital representations of the patient's upper and lower jaw, based on the bite of the patient.

In some embodiments, the complementary points are determined automatically based on a classification of the bite of the patient. Depending on the type of bite or occlusion that the patient has, the relationship between points in the teeth in the upper jaw and complementary points in the lower jaw are known, and can therefore be used to align the two 3D digital representations.

In some embodiments, the complementary points are marked manually on the 3D digital representations. This will typically be done by a dental technician in a graphical user interface. Sometimes the bite will be classified before marking the points manually. For instance, the dentist may classify the bite of the patient, and send this information to a dental technician to aid the technician in the further work.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein.

DETAILED DESCRIPTION

In the following description, reference is made to the accompanying figures, which show by way of illustration how the invention may be practiced.

Figure 1:
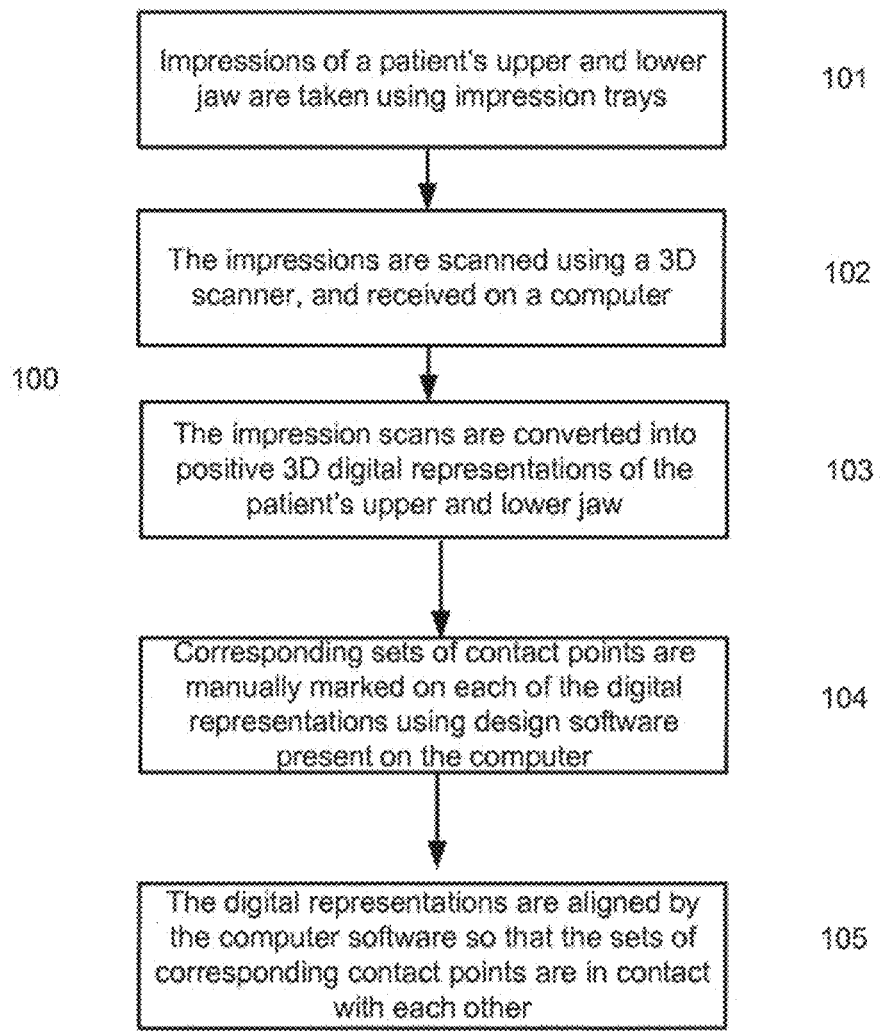
FIG. 1 shows a flowchart of the method according to an embodiment of the invention.

FIG. 1 shows an example of a method 100 according to an embodiment of the invention. In step 101, an impression is taken of each of a patient's upper and lower jaw using impression trays. The impressions may be full or partial impressions. In step 102, the impression trays are put into a 3D scanner, and scanned to create digital representations of the impressions. In step 103, the digital representations of the impressions are converted into positive 3D digital representations of the patient's upper and lower jaw. In step 104, corresponding sets of contact points are marked on each of the digital representations. Each patient will have a unique bite, and as a consequence, there will be specific contact points between the upper and lower teeth in the patient's jaw when the jaws are in occlusion. These contact points are visible to the dental technician, and therefore the dental technician can mark the contact points on the digital models. In step 105, the digital models are aligned in the correct occlusion since the corresponding contact points are matched between the upper and lower digital models.

Figure 2:
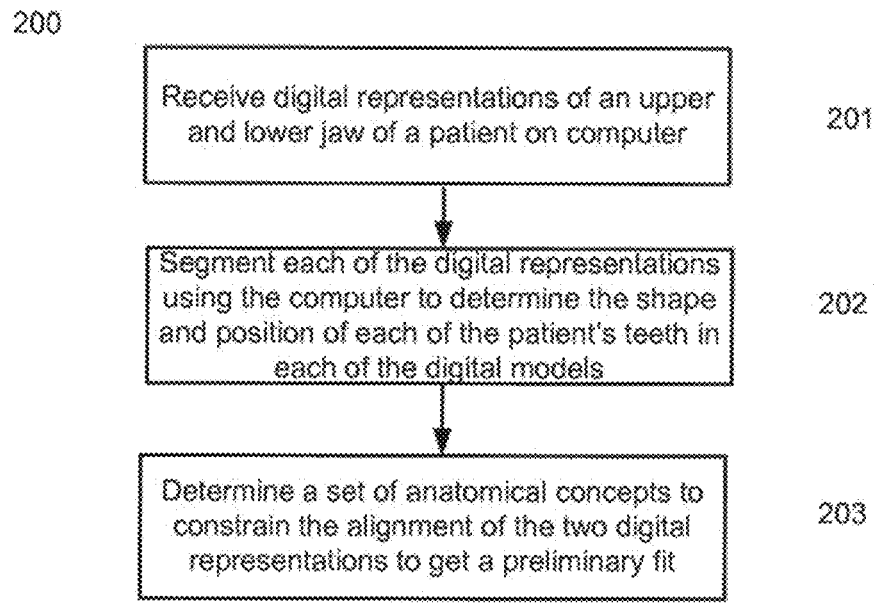
FIG. 2 shows a flowchart of the method according to another embodiment of the invention.

FIG. 2 shows an example 200 of a method according to an embodiment of the invention. In step 201, 3D digital representations of an upper and lower jaw of a patient are received on a computer. The digital representations are then segmented, so that the shape and position of each of the teeth in the digital representations are determined. Then the dentist or technician can choose one or more anatomical concepts that constrains the fit of the alignment of the digital representations, to get a preliminary fit. The anatomical concepts can be for example a class of overbite, in which case the computer software would be able to align the digital representations in the anatomically correct fashion. Since the digital representations are segmented, the software can translate the chosen anatomical concept into a measure for where and how the teeth should be aligned, based on the chosen anatomical concept(s).

Figure 3:
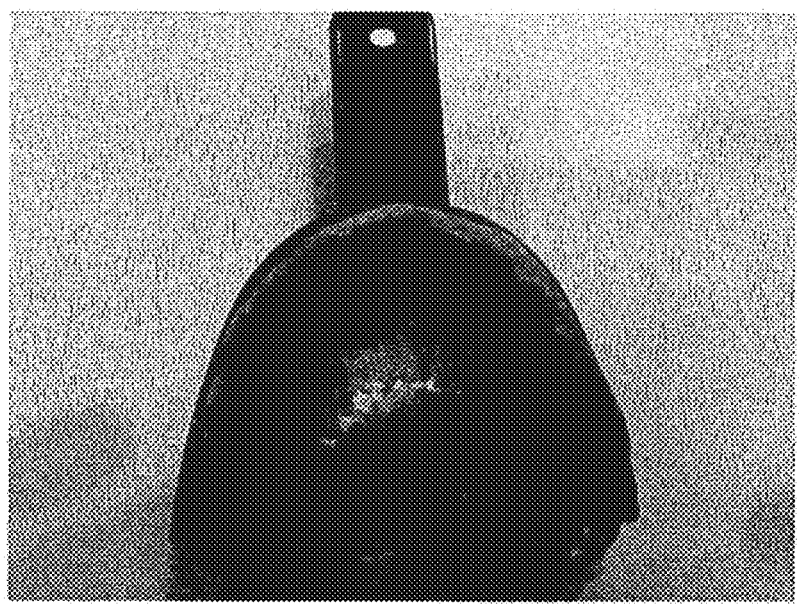
FIG. 3 shows a view of a standard impression tray.

FIG. 3 shows an example of a standard impression tray. The impression tray is filled with impression material and put into the patient's mouth. The patient then bites down on the tray and holds the bite for a number of seconds, after which the impression material will have formed around the patient's teeth, as can be seen in the figure. This tray can then be put into a 3D scanner, and scanned to create a 3D digital representation of the impression.

Figure 4A:
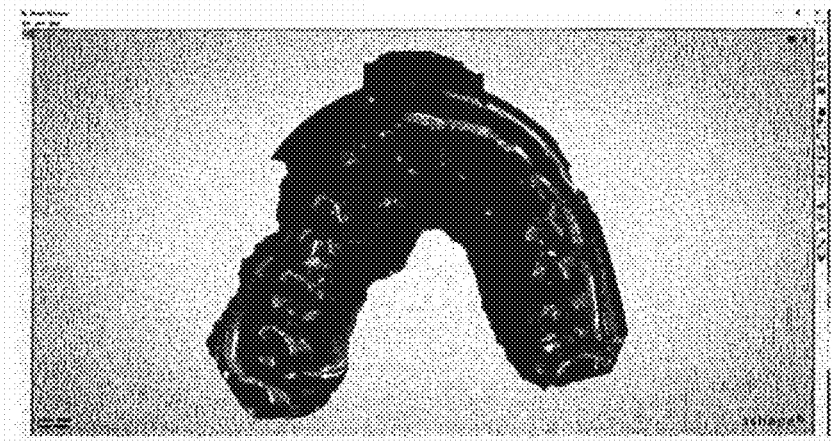
FIG. 4a-b shows the positive 3D digital representations of the patient's jaws.
Figure 4B:
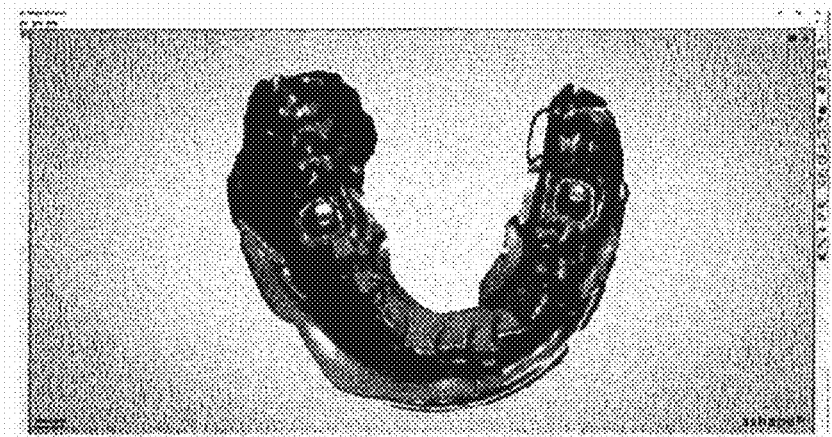

FIG. 4a shows the positive 3D digital representation of the patient's maxillary (upper) jaw. This is obtained by taking an impression of the patient's upper jaw using an impression tray as seen in FIG. 3, and inverting the impression scan to create a digital representation of the patient's upper jaw. Similarly, FIG. 4b shows the positive 3D digital representation of the patient's maxillary (lower) jaw.

Figure 5A:
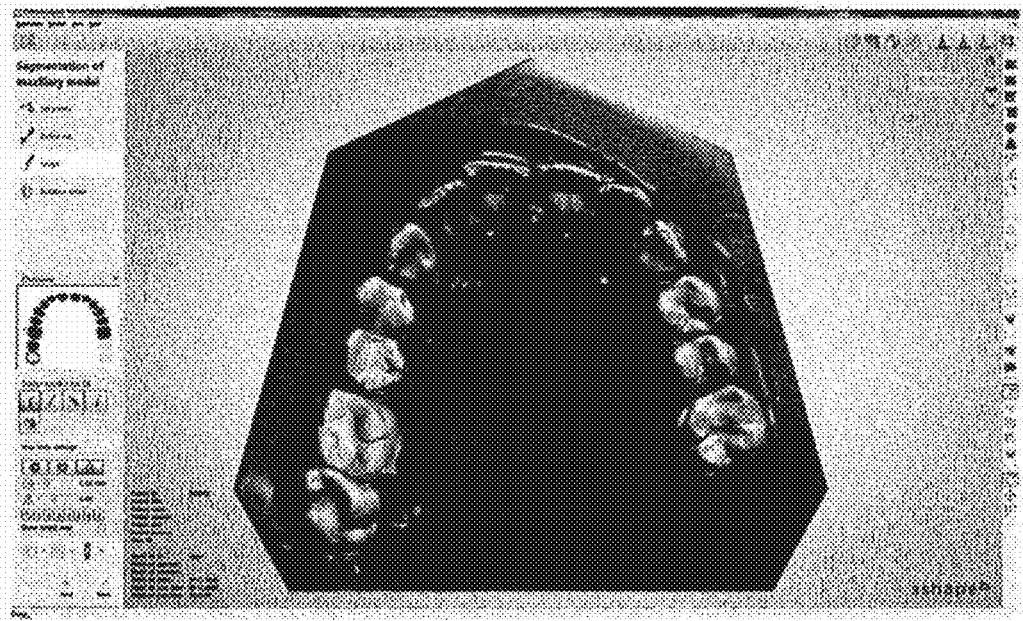
FIG. 5a-b shows the segmented 3D digital representations of the patient's jaws.
Figure 5B:
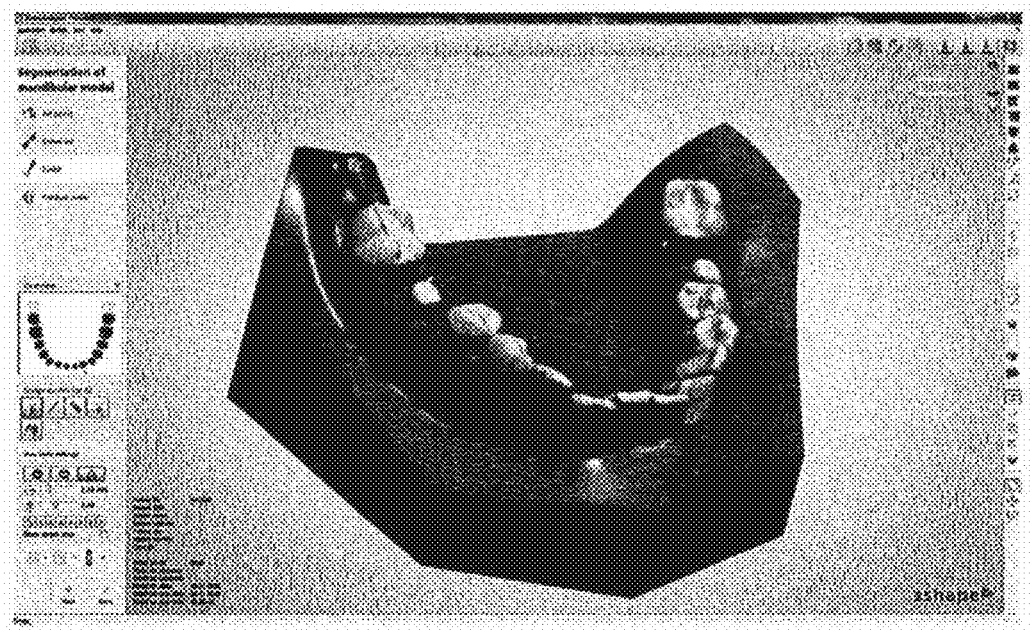

FIG. 5a shows the 3D digital representation of the patient's upper jaw, which has now been segmented. As can be seen from the figure, the size and position of each tooth is now easily seen. Similarly, FIG. 5b shows the segmented 3D digital representation of the patient's lower jaw.

Figure 6:
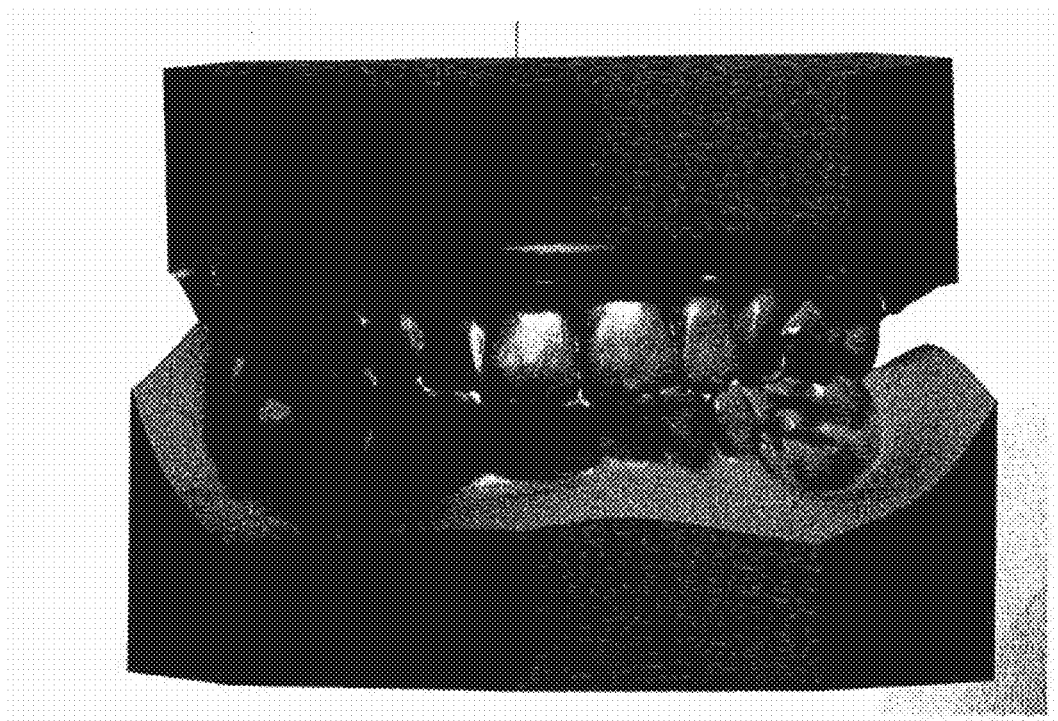
FIG. 6 shows the aligned 3D digital representations.

FIG. 6 shows the 3D digital representations of the patient's upper and lower jaw, which have now been aligned in the proper bite configuration of the patient, based on the determined or chosen anatomical concepts.

Figure 7:
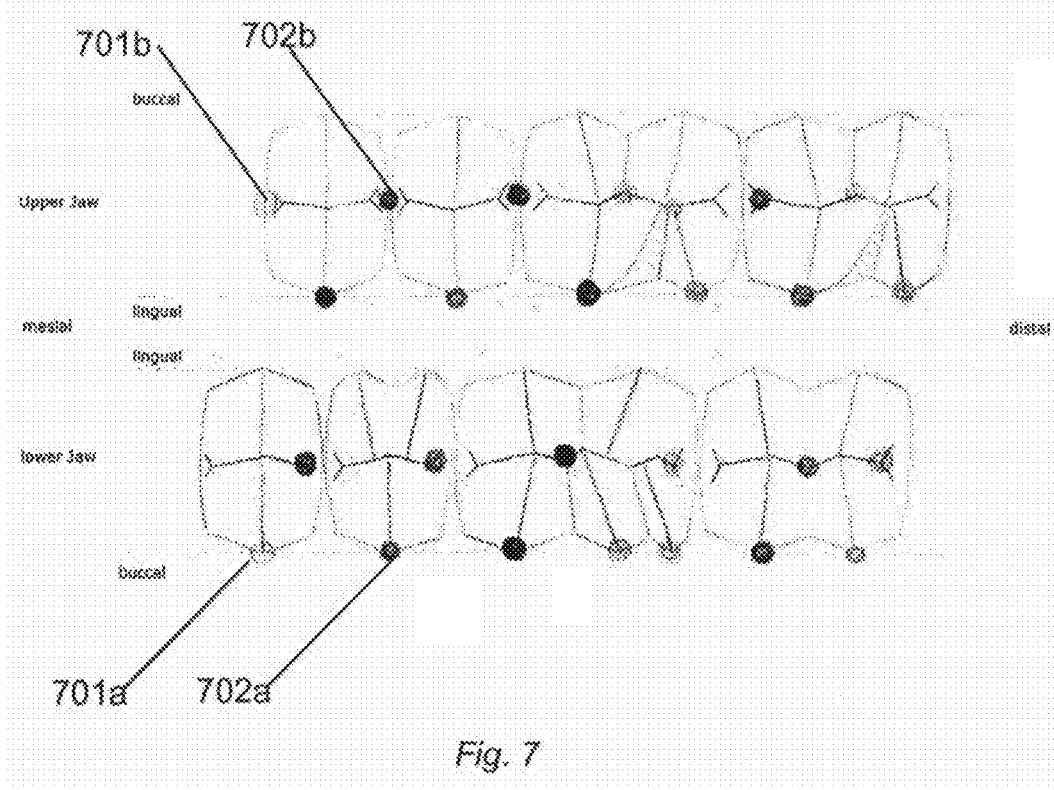
FIG. 7 shows a schematic view of the pre-molars and molars of the 3D digital representations.

With reference to FIG. 7, a schematic view of the pre-molars and molars of a patient with an ideal bite or normal occlusion is shown. Once the bite has been classified by the patient or dentist as being an ideal bite or normal occlusion, several relationships between the teeth of the upper and lower jaw are known. For example, the buccal cusp of the first pre-molar of the lower jaw, 701a, should sit in the mesial occlusal ridge of the first pre-molar of the upper jaw, 701b. The buccal cusp of the second pre-molar of the lower jaw, 702a, should sit in the occlusal ridge between the first and second pre-molar of the upper jaw, 702b, and so forth for all the teeth. If the 3D digital representations are segmented, it is possible to automatically identify the teeth, and the relevant complementary points such as 701a-701b can be identified automatically by the computer, or manually by a dental technician or dentist. Once the complementary points have been determined or selected, a preliminary fit of the upper and lower jaw 3D digital representations follows. The final fit can then can be determined using a minimum energy algorithm, for example maximizing the contact between the jaws in positions near the preliminary fit.

Figure 8:
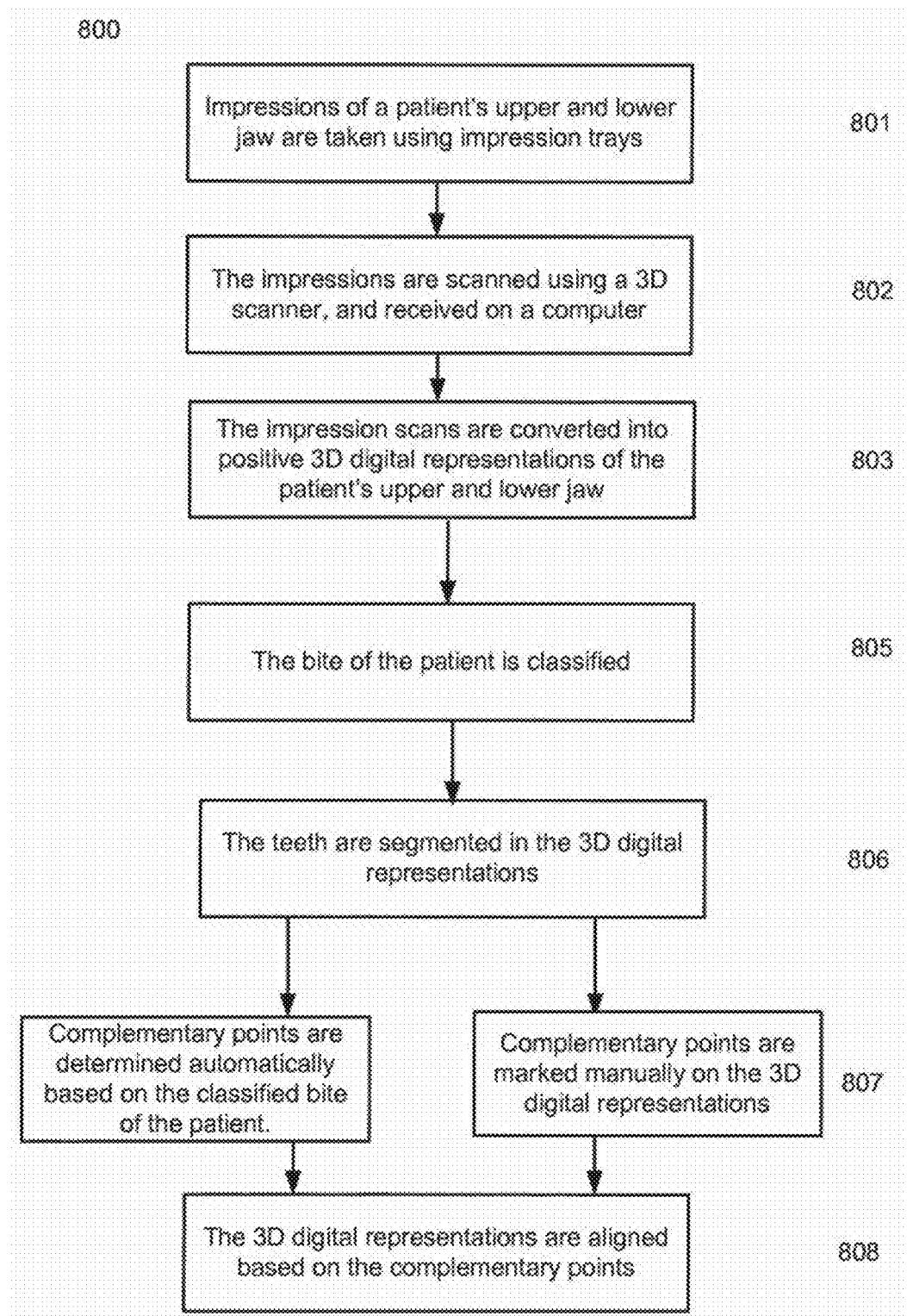
FIG. 8 shows a flowchart of a method according to an embodiment of the invention.

FIG. 8 shows a flowchart of a method 800 of an embodiment of the invention. In step 801, impressions of a patient's upper and lower jaws are taken using standard impression trays. In step 802, the impressions are scanned using a 3D scanner, for example in a dental laboratory, and the scans are received on a computer. The impression scans are then converted into positive 3D digital representations of the patient's upper and lower teeth/jaws in step 803. In step 805, the bite of the patient is classified. This step may be optional, particularly if step 807 is performed manually. This step may in fact be performed by the dentist already at step 801, or at any point of the method if necessary. In step 806, the teeth are segmented in the 3D digital representations, so that it is known which teeth are the pre-molars, canines etc. This step may also be optional if step 807 is done manually. In step 807, complementary points are determined, as described with respect to FIG. 7. Step 807 may be done either automatically on the computer, or manually by for example a dental technician using a graphical user interface. Finally, in step 808, the 3D digital representations are aligned based on the complementary points determined or marked in step 807. The alignment of the 3D digital representations may be optimized using a minimum energy algorithm, for example maximizing the contact between the two 3D digital representations in small deviations from the preliminary fit.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

A claim may refer to any of the preceding claims, and "any" is understood to mean "any one or more" of the preceding claims.

It should be emphasized that the term "comprises/comprising" when used in this specification is taken to specify the presence of stated features, integers, steps or components but does not preclude the presence or addition of one or more other features, integers, steps, components or groups thereof.

The features of the method described above and in the following may be implemented in software and carried out on a data processing system or other processing means caused by the execution of computer-executable instructions. The instructions may be program code means loaded in a memory, such as a RAM, from a storage medium or from another computer via a computer network. Alternatively, the described features may be implemented by hard-wired circuitry instead of software or in combination with software.

The invention claimed is:

1. A method of aligning two 3D digital representations of at least a part of each of the upper jaw and lower jaw of a patient, the method comprising:
    obtaining an impression scan of at least the part of each of the upper jaw and the lower jaw of the patient;
    converting the impression scans to a 3D digital representation of the at least part of the upper jaw and to a 3D digital representation of the at least part of the lower jaw of the patient;
    segmenting the 3D digital representations to determine the shape and position of each of the teeth in the 3D digital representations; and
    aligning the two 3D digital representations with respect to each other based on a relationship between complementary points of a buccal cusp of a tooth on one of the jaws and a mesial occlusal ridge of an opposing tooth on another of the jaws in each of the 3D digital representations.

2. The method according to claim 1, wherein the complementary points are marked manually on the 3D digital representations.

3. The method according to claim 1, wherein the preliminary fit of the two 3D digital representations is automatically optimized using a minimum energy algorithm.

4. The method according to claim 1, further comprising determining the complementary points of the teeth in each of the 3D digital representations.

5. The method according to claim 1, wherein the complementary points are determined automatically based on a classification of the bite of the patient.

6. A method of aligning a 3D digital representation of at least a part of an upper jaw and a 3D digital representation of at least a part of a lower jaw of a patient in order to take into account an antagonist tooth of a tooth for which a crown is being designed, the method comprising:
- obtaining a scan of at least the part of the upper jaw and obtaining a scan of at least the part of the lower jaw of the patient;
- converting the scans to an original 3D digital representation of the at least part of the upper jaw and to an original 3D representation of the at least part of the lower jaw of the patient;
- segmenting the original 3D digital representations to determine the shape and position of each of the teeth in the 3D digital representations;
- classifying a bite of the patient;
- based on the classification of the bite, selecting at least one complementary point on at least one tooth in the original 3D representation of one of the upper jaw and the lower jaw, and selecting at least one complimentary point on an antagonist tooth in the 3D representation of another of the upper jaw and the lower jaw; and
- aligning the two original 3D digital representations with respect to each other based on a relationship between the complementary points of the teeth in each of the 3D digital representations.

7. The method according to claim 6, wherein the bite is classified as one of a first classification in which antagonist teeth are in a cusp fossa relationship, or a second classification in which the antagonist teeth are not in a cusp fossa relationship.

8. The method according to claim 7, wherein the second classification is one of an overjet occlusion and a cross bite relationship.

9. The method according to claim 8, wherein a third classification is another of the overjet occlusion and the cross bite relationship.

10. The method according to claim 6, wherein the complementary points are marked manually on the 3D digital representations.

11. The method according to claim 6, wherein the complementary points are automatically marked on the 3D digital representations based on the classification of the bite.

12. The method according to claim 11, wherein automatically selecting complementary points includes selecting a point on a buccal cusp of a first tooth in one of the upper jaw and the lower jaw and a point on a mesial occlusal ridge of a tooth in another of the upper jaw and the lower jaw, and identifying such points as complementary points.

\* \* \* \* \*